United States Patent
Kozaki et al.

(10) Patent No.: US 11,446,786 B2
(45) Date of Patent: Sep. 20, 2022

(54) PART MANUFACTURING SYSTEM AND PART MANUFACTURING METHOD

(71) Applicants: MITSUBISHI HEAVY INDUSTRIES, LTD., Tokyo (JP); SINTOKOGIO, LTD., Aichi (JP)

(72) Inventors: Takashi Kozaki, Tokyo (JP); Kosuke Akanuma, Tokyo (JP); Hideaki Kaga, Aichi (JP); Kyoichi Iwata, Aichi (JP); Seiya Ikeda, Aichi (JP)

(73) Assignees: MITSUBISHI HEAVY INDUSTRIES, LTD., Tokyo (JP); SINTOKOGIO, LTD., Aichi (JP)

( * ) Notice: Subject to any disclaimer, the term of this patent is extended or adjusted under 35 U.S.C. 154(b) by 237 days.

(21) Appl. No.: 16/482,117

(22) PCT Filed: Feb. 14, 2018

(86) PCT No.: PCT/JP2018/005123
§ 371 (c)(1),
(2) Date: Jul. 30, 2019

(87) PCT Pub. No.: WO2018/151168
PCT Pub. Date: Aug. 23, 2018

(65) Prior Publication Data
US 2019/0389035 A1 Dec. 26, 2019

(30) Foreign Application Priority Data
Feb. 15, 2017 (JP) .............................. JP2017-026204

(51) Int. Cl.
*B24C 1/10* (2006.01)
*B24C 3/32* (2006.01)
(Continued)

(52) U.S. Cl.
CPC .................. *B24C 1/10* (2013.01); *B24C 1/04* (2013.01); *B24C 3/32* (2013.01); *B25J 13/08* (2013.01);
(Continued)

(58) Field of Classification Search
CPC ..... B24C 1/10; B24C 1/04; B24C 3/32; B25J 13/08; B64F 5/10; B64C 3/26; B64C 3/182; B24B 27/00
See application file for complete search history.

(56) References Cited

U.S. PATENT DOCUMENTS 4,432,220 A   2/1984  Loersch et al.
4,694,672 A   9/1987  Baughman
(Continued)

FOREIGN PATENT DOCUMENTS

CN   202491181 U   10/2012
JP   S58-052421 A   3/1983
(Continued)

OTHER PUBLICATIONS

Extended European Search Report in corresponding European Application No. 18754120.6, dated Oct. 29, 2020 (8 pages).
(Continued)

*Primary Examiner* — Ryan J. Walters
(74) *Attorney, Agent, or Firm* — Osha Bergman Watanabe & Burton LLP (57) ABSTRACT

An object is to enable accurate machining by enabling shots to be accurately blasted on a workpiece even while workpiece is being deformed. A part manufacturing system includes: a peening device including a nozzle that projects a plurality of shots toward a workpiece, and a sensor that detects a distance to the workpiece; and a machining robot including a hand to which the peening device is attached, and a control unit that adjusts a position or an orientation of
(Continued)

the peening device by controlling the hand based on the distance detected by the sensor.

4 Claims, 9 Drawing Sheets

(51) Int. Cl.
*B25J 13/08* (2006.01)
*B64F 5/10* (2017.01)
*B24C 1/04* (2006.01)
*B64C 3/18* (2006.01)
*B64C 3/26* (2006.01)

(52) U.S. Cl.
CPC ............. *B64F 5/10* (2017.01); *B64C 3/182* (2013.01); *B64C 3/26* (2013.01)

(56) References Cited

U.S. PATENT DOCUMENTS

| | | |
|---|---|---|
| 6,189,356 B1 | 2/2001 | Simeone et al. |
| 9,027,375 B2 | 5/2015 | Hennig et al. |
| 2002/0072297 A1* | 6/2002 | Kennerknecht ......... B24B 19/26 451/5 |
| 2004/0074093 A1 | 4/2004 | McCarvill et al. |
| 2006/0168809 A1 | 8/2006 | McCarvill et al. |
| 2010/0204817 A1 | 8/2010 | Fujita |
| 2011/0138873 A1 | 6/2011 | Razi et al. |
| 2013/0025422 A1 | 1/2013 | Chillman et al. |
| 2015/0258596 A1 | 9/2015 | Kozaki |
| 2016/0059382 A1 | 3/2016 | Kondo et al. |
| 2016/0114370 A1 | 4/2016 | Kozaki et al. |
| 2021/0101256 A1* | 4/2021 | Hirao ....................... B24C 9/00 |

FOREIGN PATENT DOCUMENTS

| | | |
|---|---|---|
| JP | H06-083255 U | 11/1994 |
| JP | 08090417 A * | 4/1996 |
| JP | H10-000560 A | 1/1998 |
| JP | 2000-225528 A | 8/2000 |
| JP | 2001-277118 A | 10/2001 |
| JP | 3740103 B2 | 2/2006 |
| JP | 2007-136628 A | 6/2007 |
| JP | 2008-049369 A | 3/2008 |
| JP | 2009-066713 A | 4/2009 |
| JP | 2011-051073 A | 3/2011 |
| JP | 2011-125999 A | 6/2011 |
| JP | 2016-049571 A | 4/2016 |
| JP | 6104725 B2 | 3/2017 |

OTHER PUBLICATIONS

International Search Report and Written Opinion in corresponding International Application No. PCT/JP2018/005123, dated Apr. 10, 2018 (15 pages).
The Notice of Reasons for Refusal issued in corresponding Japanese Application No. 2017-026204, dated Mar. 23, 2021 (8 pages).
The Notice of Reasons for Refusal issued in corresponding Japanese Application No. 2017-026204, dated Sep. 1, 2020 (8 pages).
Second Office Action in corresponding Chinese Application No. 201880009177.4, dated Jun. 22, 2021 (19 pages).

* cited by examiner

PART MANUFACTURING SYSTEM AND PART MANUFACTURING METHOD

TECHNICAL FIELD

The present invention relates to a part manufacturing system and a part manufacturing method, and more particularly, to a part manufacturing system and a part manufacturing method for manufacturing an aircraft part which is manufactured by combining a skin, which is a plate-shaped member, and a stringer, which is an elongated member.

BACKGROUND ART

For example, an aircraft part such as a primary wing is formed by combining a skin, which is a plate-shamed member, and a stringer, which is an elongated member which is provided on the skin. In the case where the aircraft part has a three-dimensional curved surface, such as a saddle shape, for example, the skin and the stringer are machined by a peen forming method into a shape having a predetermined curved surface. The peen forming method is a machining method of plastically deforming a workpiece by projecting steel balls (having a diameter of 5 mm, for example) called "shots" to the workpiece.

Figure 9A:
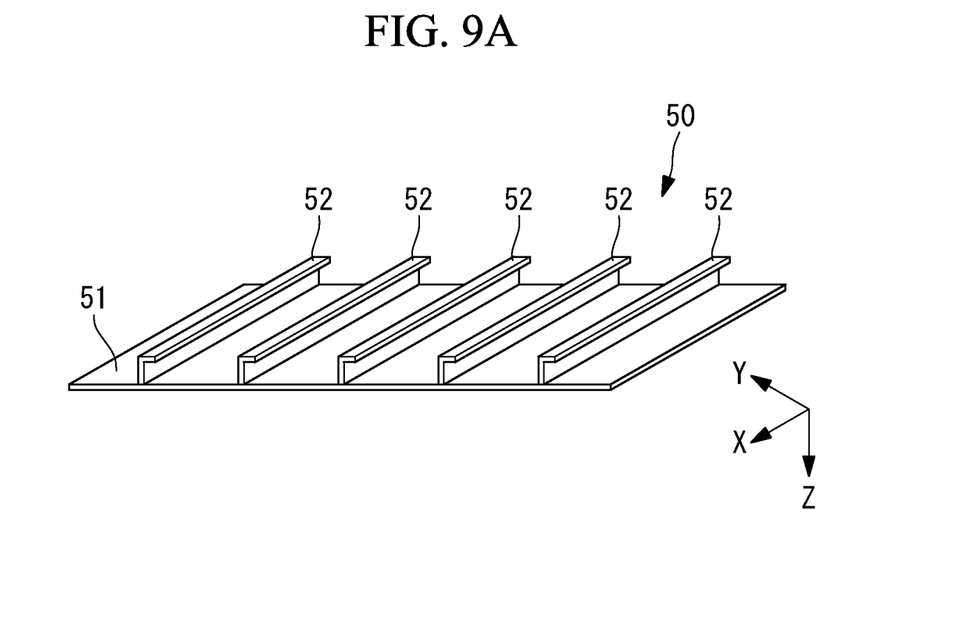
FIG. 9 is a perspective view showing an integrated member.
Figure 9B:
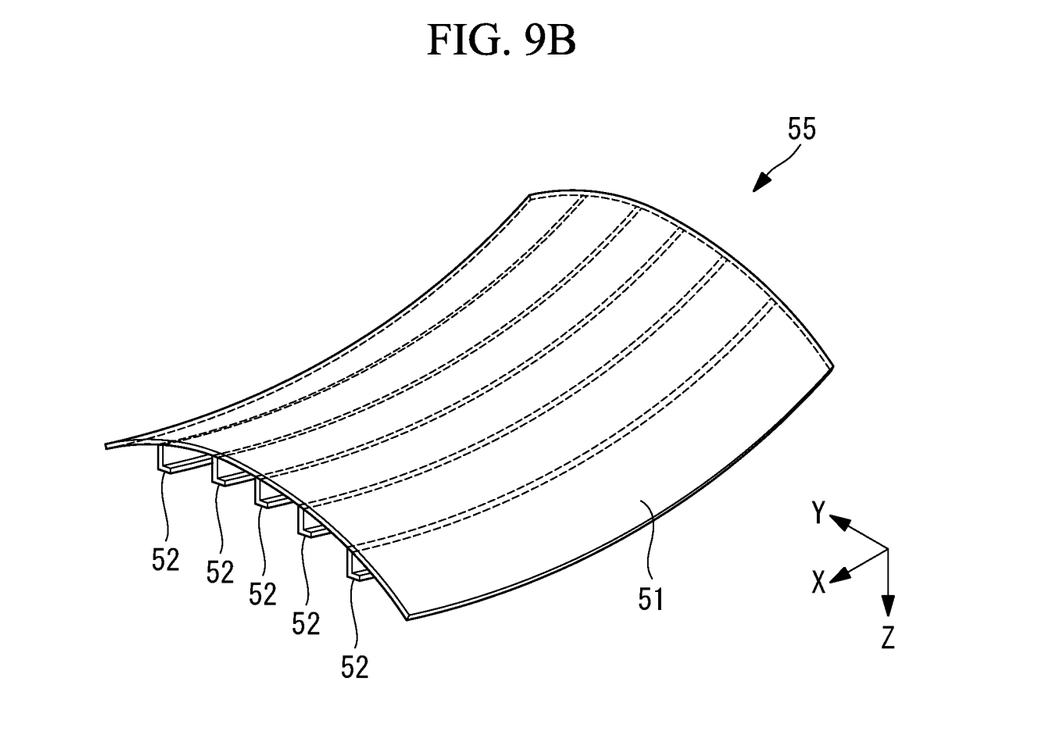
FIG. 9B is a perspective view showing an aircraft part obtained by applying peen forming to the integrated member.

For example, as shown in FIG. 9A, peen forming is performed on an integrated member 50 including a flat plate-shaped skin 51 and stringers 52, which are provided on the skin 51, to plastically deform the integrated member 50. As a result, a saddle-shaped aircraft part 55 is formed, as shown in FIG. 9B.

PTL1 mentioned below discloses a technology including a main machining step of forming, by projecting shots at a high speed to add a plastic strain, a surface of a flat plate section (primary wing outer plate) opposite a surface where a reinforcing section (stringer) is provided, and a corrective machining step, performed after the main machining step, of projecting shots at a high speed to the reinforcing section. In the corrective machining step, the plastic strain of a plate-shaped metal member in a direction along a longitudinal direction of the reinforcing section is corrected.

CITATION LIST

Patent Literature

[PTL 1]
the Publication of Japanese Patent No. 3740103

SUMMARY OF INVENTION

Technical Problem

In the peen forming method, a workpiece is continuously deformed while the shots (steel balls) are projected at a high speed to the workpiece, and positions that are hit by the shots are thereby changed, and thus, precise prediction of a deformation process is difficult. Accordingly, it is difficult to predict appropriate positions to be hit by the shots, and to set projection directions of the shots in advance by teaching or the like.

Furthermore, the peen forming method includes a method of using a nozzle or an impeller (rotary blades including a plurality of blades) as a means for projecting shots, and in either case, the nozzle or the impeller has to be separated from the workpiece by a predetermined distance or more. Accordingly, there is a problem that it is difficult to accurately blast the shots.

If a shot hits a corner of a workpiece and the corner of the workpiece is deformed, strength is reduced, and thus, in the case of an aircraft part, cracks may be caused when a load is applied at the time of flying or the like. Accordingly, there is a technique of preventing a region which should not be deformed by the peen forming method, such as a corner of a workpiece, from being directly hit by the shots, by using a rubber sheet or the like. In this case, there is a problem that time and labor are required because a work of attaching a rubber sheet to the region which should not be hit by the shots has to be performed before performing peen forming. Moreover, the rubber sheet may be peeled off during high-speed projection of the shots, and if the rubber sheet is peeled off, the corner of the workpiece may be deformed by the shots.

In the case of forming an aircraft part having a complex three-dimensional shape, a machining part of the workpiece is divided into a plurality of regions in advance, and target values are set for each region with respect to a curvature radius and a plate thickness. In this case, projection conditions of shots (such as a shot flow rate, or an air pressure in the case of a nozzle, or an impeller speed in the case of an impeller) are set for each region, according to the target values set for each region. With a conventional technique, shots are continuously projected to the workpiece, and projection positions of the shots are moved as the projection conditions of the shots are being changed, and thus, projection of the shots is performed also while moving between two regions (transient period). Accordingly, because the shots are projected to the workpiece also while the projection conditions of the shots are not settled, unexpected deformation is possibly caused.

The present invention has been made in view of such circumstances, and has its object to provide a part manufacturing system and a part manufacturing method which are capable of accurately blasting shots to a workpiece even while the workpiece is being deformed, and thus, of performing machining with high accuracy.

Solution to Problem

A part manufacturing system according to a first aspect of the present invention includes a peening device including a nozzle section that projects a plurality of shots toward a workpiece, and a detection unit that detects a distance to the workpiece; and a robot device including a hand section to which the peening device is attached, and a control unit that adjusts a position or an orientation of the peening device by controlling the hand section based on the distance detected by the detection unit.

According to such a configuration, a plurality of shots, such as steel balls, are projected from the nozzle section to the workpiece, and the workpiece is deformed. Furthermore, the distance to the workpiece is detected by the detection unit, and the position or the orientation of the peening device is adjusted by the robot device, based on the distance detected by the detection unit. As a result, shots may be accurately blasted toward a predetermined position on the workpiece.

In the aspect described above, the workpiece may be an elongated member, at least two detection units may be provided as the detection unit, and the control unit may adjust the position of the peening device based on an average distance to the workpiece that is calculated from the distances detected by the at least two detection units.

According to such a configuration, the distance to the workpiece is detected by at least two detection units, and an average distance to the workpiece is calculated. Then, the position of the peening device is adjusted based on the calculated average distance.

In the aspect described above, the workpiece may be an elongated member, at least two detection units may be provided as the detection unit, and the control unit may adjust the orientation of the peening device based on a tilt angle of the workpiece that is calculated from the distances detected by the at least two detection units.

According to such a configuration, the distance to the workpiece is detected by at least two detection units, and the tilt angle of the workpiece is calculated. Then, the orientation of the peening device is adjusted based on the calculated tilt angle.

In the aspect described above, the peening device may further include a protection section that covers a part of the workpiece.

According to such a configuration, when the workpiece is to be deformed by projection of a plurality of shots, such as steel balls, from the nozzle section to the workpiece, a part of the workpiece is covered by the protection section, and thus, the part of the workpiece covered by the protection section may be prevented from becoming deformed.

In the aspect described above, the peening device may further include a blocking section that can be installed at a passage section where the shots pass through from the nozzle section to the workpiece, and that can be installed outside the passage section, and when installed at the passage section, the blocking section may reflect the shots projected from the nozzle section, in a direction different from a direction of the workpiece.

According to such a configuration, the blocking section is installed at the passage section where the shots pass through from the nozzle section to the workpiece, or is installed outside the passage section, and when the blocking section is installed at the passage section, the shots projected from the nozzle section are reflected in a direction different from the direction of the workpiece. As a result, while the blocking section is installed at the passage section, the plurality of shots is not projected to the workpiece, and deformation of the workpiece is prevented.

A part manufacturing method according to a second aspect of the present invention includes the steps of: projecting, by a nozzle section, a plurality of shots toward a workpiece; detecting, by a detection unit, a distance to the workpiece; and adjusting, by a robot device to which a peening device including the nozzle section and the detection unit is attached, a position or an orientation of the peening device based on the distance detected by the detection unit.

Advantageous Effects of Invention

According to the present invention, shots may be accurately blasted to a workpiece even while the workpiece is being deformed, and thus, machining may be performed with high accuracy.

DESCRIPTION OF EMBODIMENTS

An aircraft part manufacturing system 1 according to an embodiment of the present invention is capable of deforming a workpiece by a peen forming (peening machining) method. For example, the aircraft part manufacturing system 1 is used to manufacture an aircraft part. An aircraft part here is a primary wing of an aircraft, for example.

In the following, a description will be given of a case where a skin, which is a plate-shaped member, and stringers, which are elongated members, are combined to manufacture a primary wing of an aircraft. In the following, an integrated member 50, as shown in FIG. 9A, integrating a skin 51 and stringers 52, which is not yet machined by a peen forming method, and the skin 51 or the stringer 52 which is not yet machined will be referred to as "workpiece".

Furthermore, for the sake of convenience, a direction parallel to a longitudinal direction of the stringer 52, as a workpiece, will be given as an X-axis, a direction parallel to a width direction of the stringer 52, which is perpendicular to the longitudinal direction, will be given as a Y-axis, and a direction parallel to a height direction of the stringer 52 will be given as a Z-axis.

A plurality of stringers 52 are disposed on one surface of the skin 51, in parallel along one direction, and are integrally combined with the skin 51. Then, peen forming is applied to the skin 51 and the stringers 52 (workpiece) which are integrated, and the integrated member 50 is plastically deformed, and an aircraft part such as a primary wing having a three-dimensional curved surface is manufactured. The peen forming method is a machining method of plastically deforming a workpiece by projecting steel balls (having a diameter of 5 mm, for example) called "shots" to the workpiece. As shown in FIG. 9B, an aircraft part 55 after peen forming has a saddle shape, for example. That is, a cross section cut in parallel with an XZ plane has a curved line which protrudes downward, and a cross section cut in parallel with a YZ plane has a curved line which protrudes upward.

In the present embodiment, the stringer 52, as a workpiece, is divided into a plurality of regions along the longitudinal direction, and target values of a curvature radius and a plate thickness are changed for each region. Machining may thereby be performed such that integrated skin 51 and stringer 52 are formed not only into a simple curved shape bent in one direction (i.e., a conical shape or a cylindrical shape), but also into a complex curved shape bent in two directions (i.e., a saddle shape).

Figure 1:
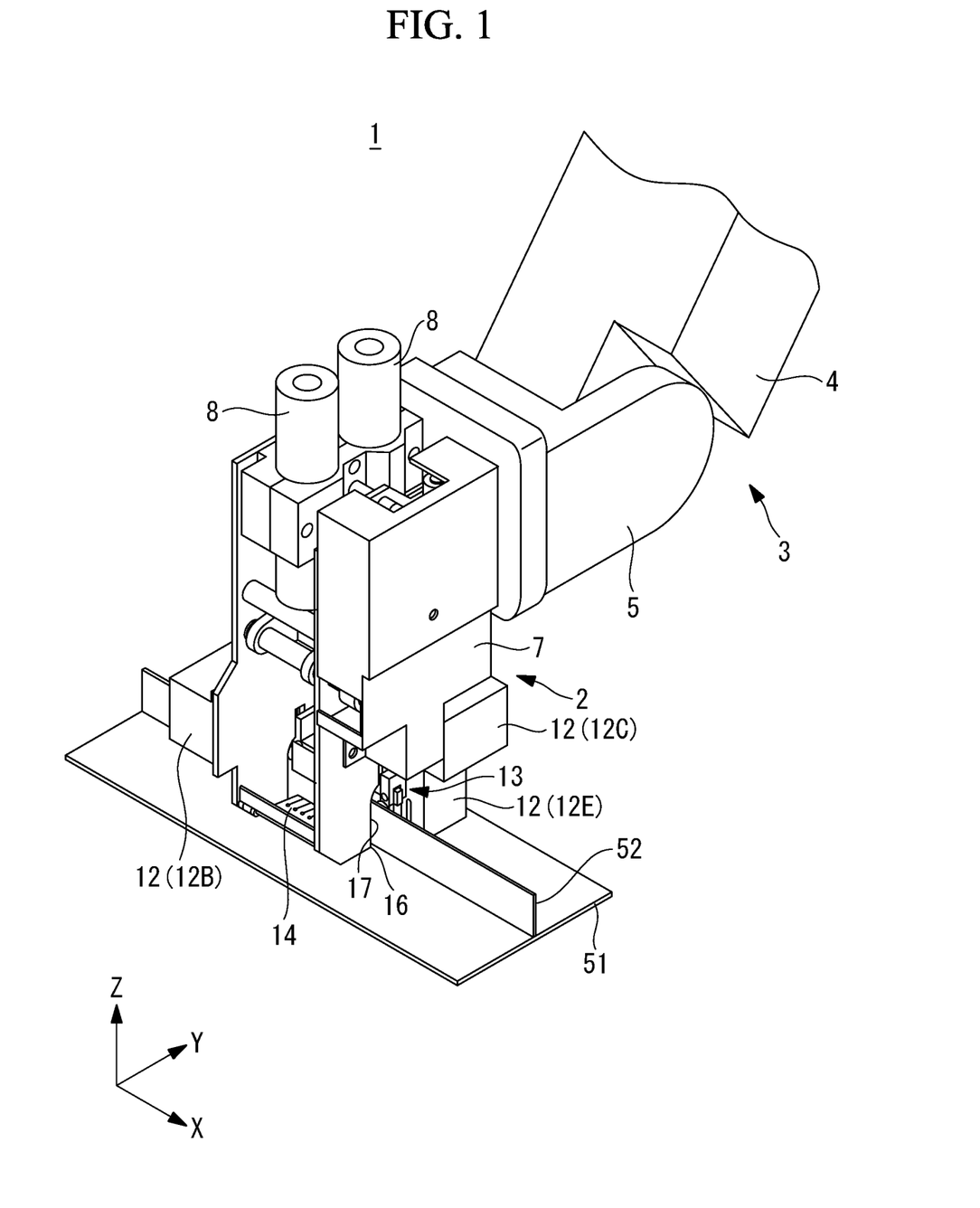
FIG. 1 is a perspective view showing an aircraft part manufacturing system according to an embodiment of the present invention.

As shown in FIG. 1, the aircraft part manufacturing system 1 according to the present embodiment includes a peening device 2, a machining robot 3 having the peening device 2 attached to a hand 5, and the like.

As shown in FIG. 1, the machining robot 3 includes an arm 4, and the hand 5 to which the peening device 2 is fixed or which grasps the peening device 2 is attached at a tip end of the arm 4. The machining robot 3 adjusts a position or an orientation (posture) of the peening device 2 by controlling a position or an orientation (posture) of the hand 5. The machining robot 3 is controlled by a control unit 6.

Figure 2:
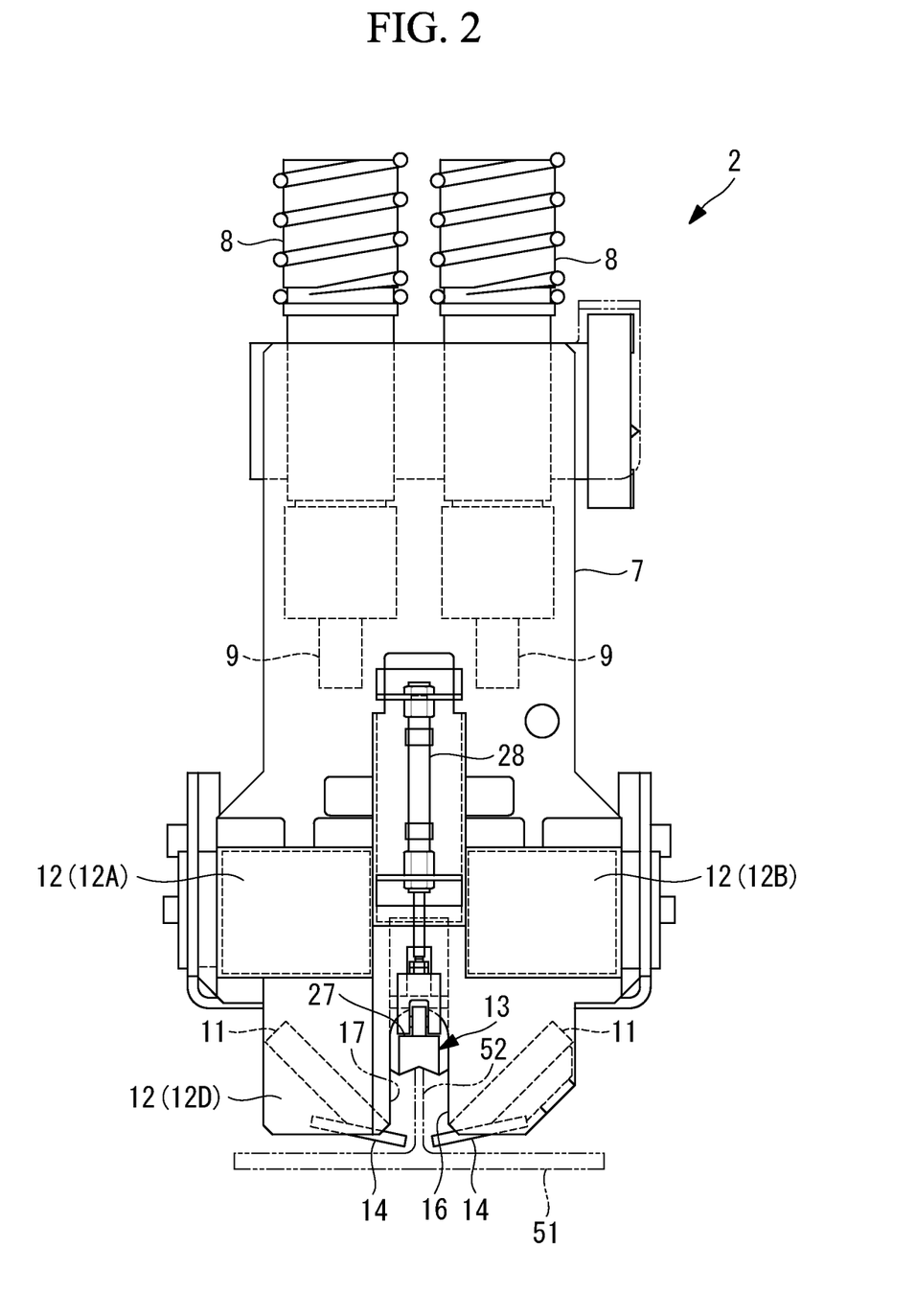
FIG. 2 is a front view showing a peening device according to the embodiment of the present invention.
Figure 3:
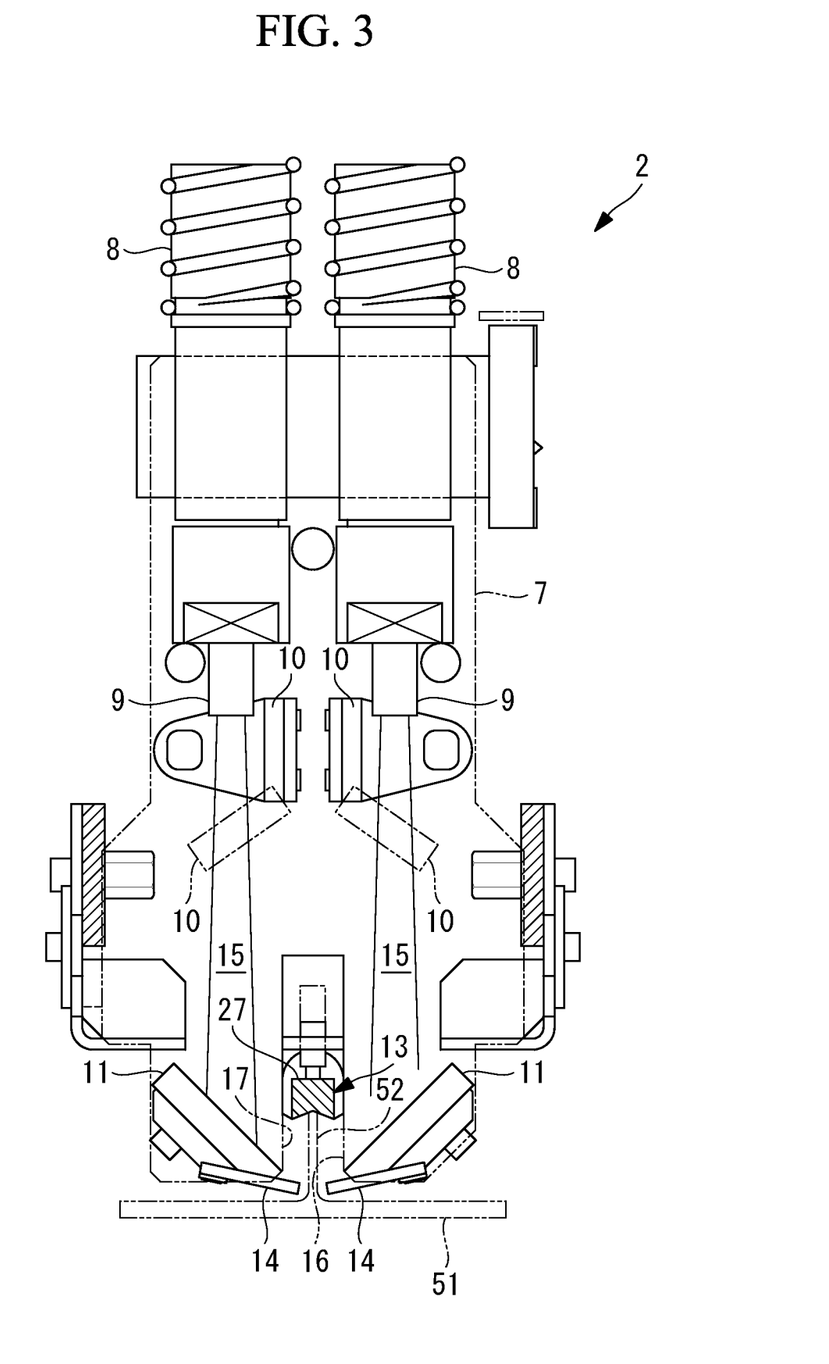
FIG. 3 is a vertical cross-sectional view showing the peening device according to the embodiment of the present invention.

As shown in FIGS. 1 to 3, the peening device 2 includes a casing 7, a shot supply section 8, a nozzle 9, a blocking plate 10, a reflection plate 11, a sensor 12, a protection section 13, and the like.

The above mentioned shot supply section 8, the nozzle 9, the blocking plate 10, the reflection plate 11, the sensor 12, the protection section 13, and the like are attached to the casing 7.

The shot supply section 8 is connected to an external supply tube (not shown), and a plurality of shots are continuously supplied through the supply tube.

Figure 5:
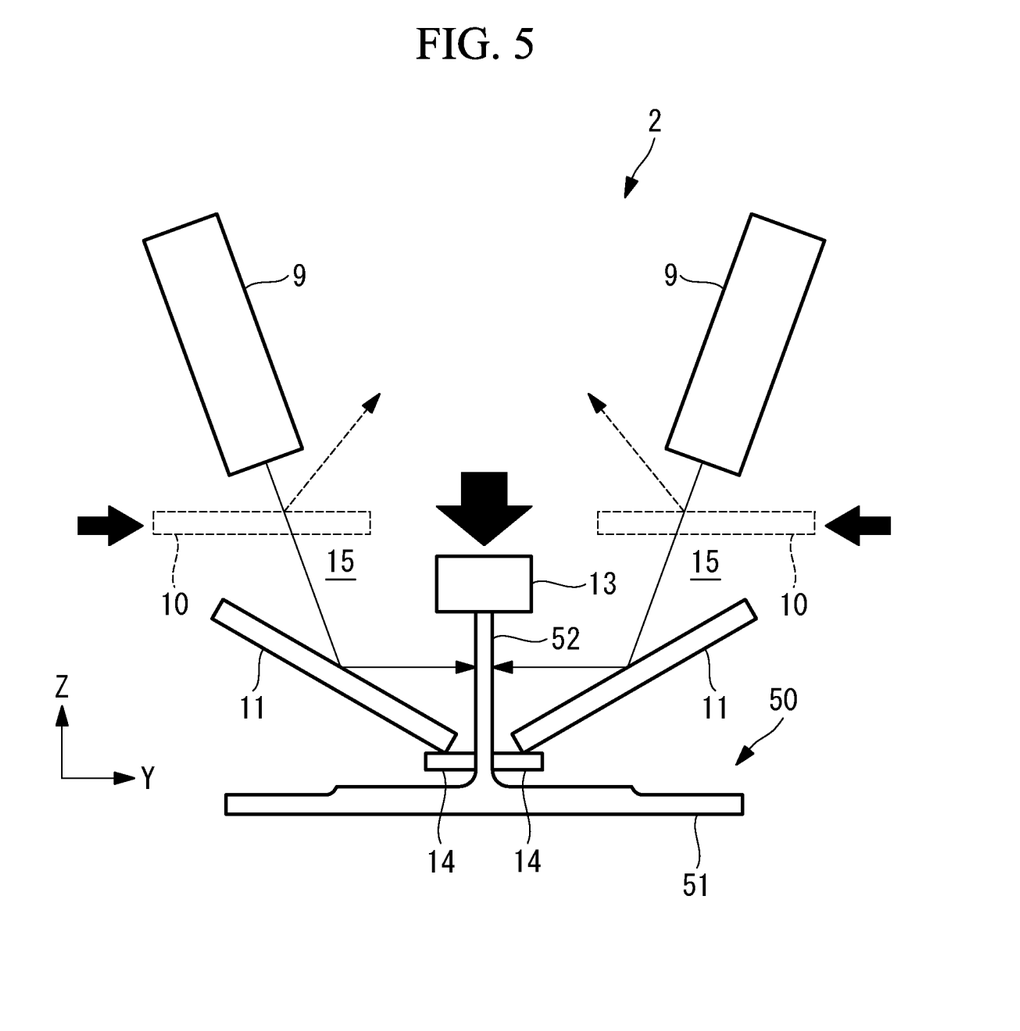
FIG. 5 is a schematic diagram showing the peening device according to the embodiment of the present invention.

The nozzle 9 is installed at a tip end of the shot supply section 8, or in other words, on a downstream side of a flow of shots. Shots are projected from the nozzle 9 toward a workpiece. Positions and orientations of the shot supply section 8 and the nozzle 9 are fixed with respect to the casing 7. As shown in FIG. 5, in the present embodiment, a shot which is projected from the nozzle 9 hits the reflection plate 11, and then hits the stringer 52, which is the workpiece.

Nozzles 9 are installed along a Y-axis direction, one on each side of the stringer 52, which is the workpiece. Shots may be projected to plate surfaces of both sides of the stringer 52 by the two nozzles 9.

A shot passes through a passage section 15, from the nozzle 9 to the reflection plate 11. The blocking plate 10 is an example of a blocking section, and is movably installed to the casing 7 to be installed at the passage section 15 or to be installed outside the passage section 15. When the blocking plate 10 is moved and installed at the passage section 15, a shot which is projected from the nozzle 9 is reflected in a direction different from a direction toward the stringer 52. As a result, while the blocking plate 10 is installed at the passage section 15, a plurality of shots is not projected to the stringer 52, and deformation of the stringer 52 is prevented. On the other hand, when the blocking plate 10 is installed outside the passage section 15, shots which are projected from the nozzle 9 are projected to the reflection plate 11, and the shots which are reflected by the reflection plate 11 are projected to the stringer 52.

The reflection plate 11 is a plate-shaped member which is installed on a downstream side of the passage section 15, and which reflects the shots. A material which is not easily deformed when hit by a shot is used for the reflection plate 11. For example, the reflection plate 11 is installed to change a flow direction of a shot, which is projected from the nozzle 9, toward the stringer 52. The flow direction of a shot toward the stringer is a direction which is approximately perpendicular to a plate surface of the stringer 52, or which forms an angle within a range of 60 degrees or more and 90 degrees or less with respect to the plate surface, for example.

An opening section 16 where the stringer 52 can be inserted is formed at one end portion of the peening device 2. Furthermore, a recessed section 17 is formed at a side surface portion of the casing 7 so as to allow insertion of the stringer 52 having an elongated shape. A sealant 14 that prevents shots from hitting the skin 51 is provided on the opening section 16, along an X-axis direction. The sealant 14 is made of rubber, for example.

The sensor 12 is installed on the casing 7, and detects a distance to the stringer 52 or the skin 51, as a workpiece. The sensor 12 is a laser displacement sensor, for example, and detects a distance to a measurement target by radiating laser light and receiving reflected laser light. Position and orientation of the sensor 12 are fixed with respect to the casing 7, and relative positions and relative directions of the nozzle 9 and the sensor 12 are constant. Accordingly, the position and the orientation of the nozzle 9 may be changed based on a detection result of the sensor 12. Additionally, an installation direction of the sensor 12 may, but does not have to, be perpendicular to the measurement target. The distance from the sensor 12 to the measurement target is detected based on a measurement value which is converted according to an installation angle of the sensor 12.

Figure 4:
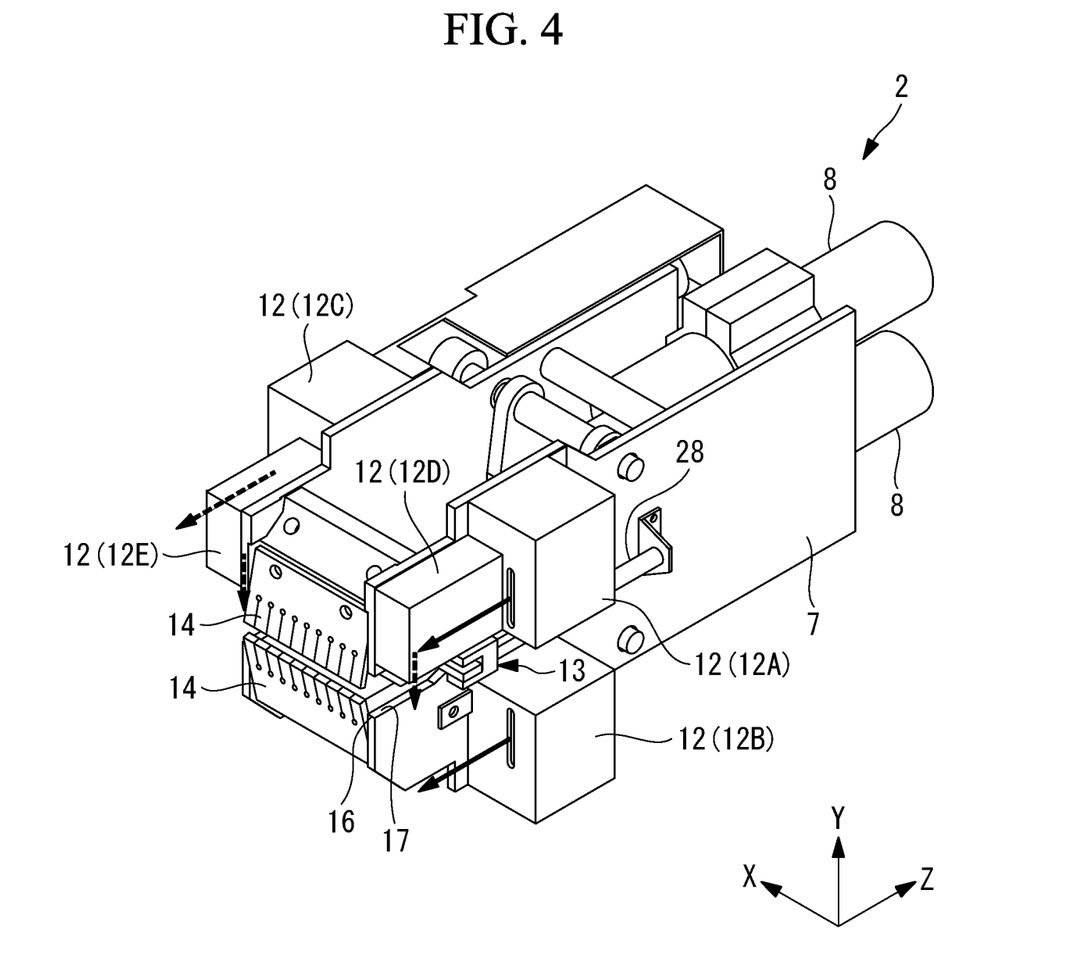
FIG. 4 is a perspective view showing the peening device according to the embodiment of the present invention.

As shown in FIG. 4, sensors 12A, 12C are each disposed on one side of the stringer 52, along the longitudinal direction of the stringer 52 which is installed at the peening device 2, or in other words, along the X-axis direction. The sensor 12A, 12C is installed in a direction of radiating laser light toward a plate surface of the skin 51 when the workpiece is installed at the peening device 2. The sensor 12A, 12C detects a distance from the sensor 12A, 12C to the skin 51.

As shown in FIG. 4, sensors 12D, 12E are each disposed on the one side of the stringer 52, along the longitudinal direction of the stringer 52 which is installed at the peening device 2, or in other words, along the X-axis direction. The sensor 12D, 12E is installed in a direction of radiating laser light toward the plate surface of the stringer 52 when the workpiece is installed at the peening device 2. The sensor 12D, 12E detects a distance from the sensor 12D, 12E to the stringer 52.

As shown in FIG. 4, the sensors 12A, 12B are disposed sandwiching the stringer 52 along the width direction, which is a direction perpendicular to the longitudinal direction of the stringer 52 installed at the peening device 2, or in other words, along the Y-axis direction. The sensor 12A is disposed on the one side of the stringer 52, and the sensor 12B is disposed on the other side of the stringer 52. The sensor 12B is installed in a direction of radiating laser light toward a plate surface of the skin 51 when the workpiece is installed at the peening device 2. The sensor 12B detects a distance from the sensor 12B to the skin 51.

Figure 6:
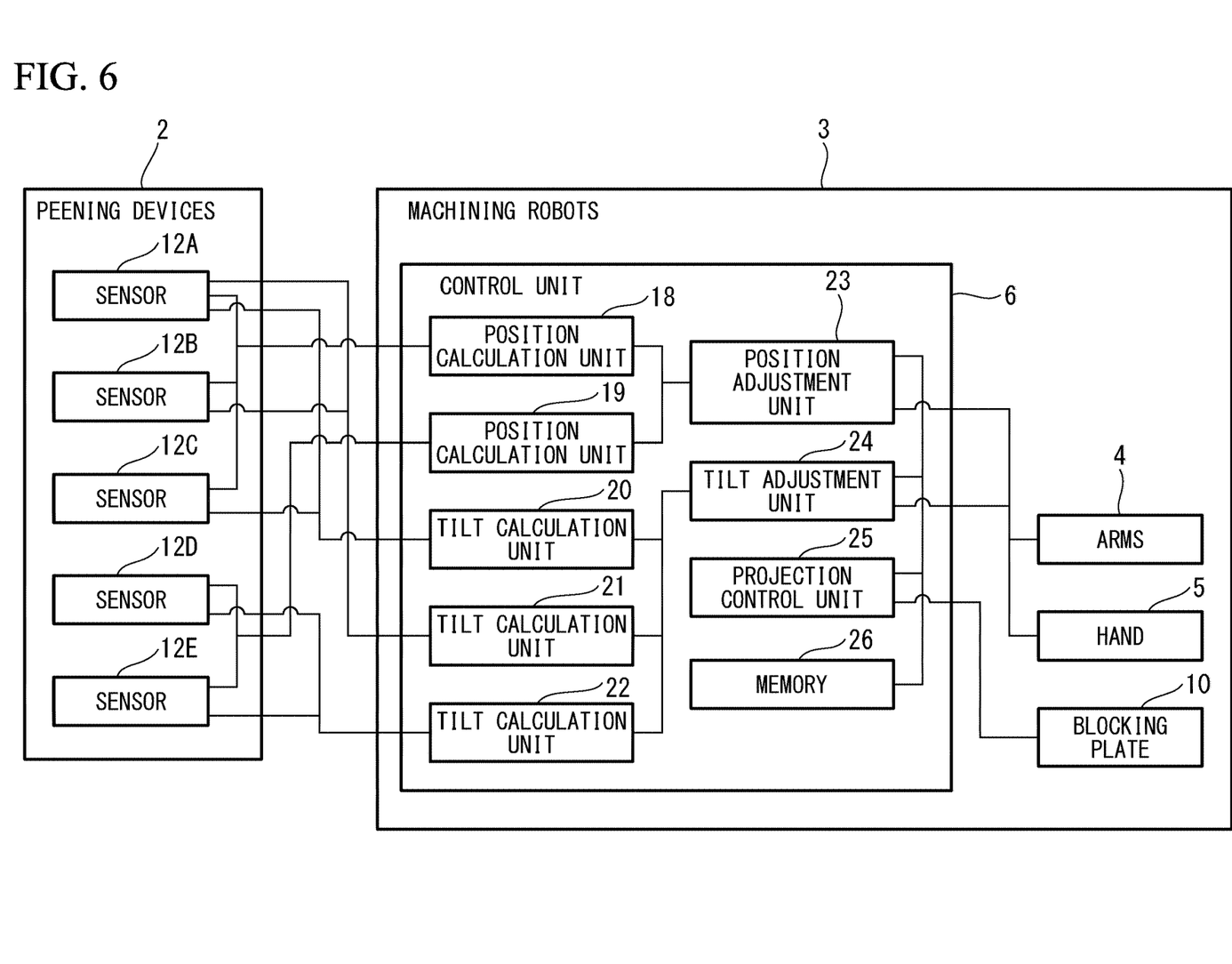
FIG. 6 is a block diagram showing the aircraft part manufacturing system according to the embodiment of the present invention.

As shown in FIG. 6, the control unit 6 of the machining robot 3 includes position calculation units 18, 19, tilt calculation units 20, 21, 22, a position adjustment unit 23, a tilt adjustment unit 24, a projection control unit 25, a memory 26, and the like. Operation of the control unit 6 is implemented by executing programs that are recorded in advance, and by hardware resources such as a CPU.

The position calculation unit 18 calculates an average distance from the sensors 12A, 12B, 12C to the skin 51, based on the distances detected by the sensor 12A and the sensor 12C, the distances detected by the sensor 12A and the sensor 12B, or the distances detected by the sensor 12A, the sensor 12B, and the sensor 12C. Additionally, installation positions of the sensors 12A, 12B, 12C are possibly not at a same height, and in such a case, the distance is calculated based on a weighted average.

The position calculation unit 19 calculates an average distance from the sensors 12D, 12E to the stringer 52, based on the distances detected by the sensor 12D and the sensor 12E. Additionally, installation positions of the sensors 12D, 12E are possibly not at a same height, and in such a case, the distance is calculated based on a weighted average.

The tilt calculation unit 20 calculates a tilt angle of the longitudinal direction of the stringer 52 with respect to a horizontal plane, based on the distances detected by the sensor 12A and the sensor 12C. That is, a rotation angle around the Y-axis is calculated by the tilt calculation unit 20.

The tilt calculation unit 21 calculates a tilt angle of the width direction of the stringer with respect to the horizontal plane, based on the distances detected by the sensor 12A and the sensor 12B. That is, a rotation angle around the X-axis is calculated by the tilt calculation unit 21.

The tilt calculation unit 22 calculates a tilt angle of the longitudinal direction of the stringer with respect to the X-axis direction, based on the distances detected by the sensor 12D and the sensor 12E. That is, a rotation angle around the Z-axis is calculated by the tilt calculation unit 22.

The position adjustment unit 23 adjusts a position of the peening device 2, based on the average distances calculated by the position calculation units 18, 19.

Specifically, the position adjustment unit 23 adjusts a projection position in the Z-axis direction by using the average distance from the sensors 12A, 12C to the skin 51 calculated by the position calculation unit 18. Furthermore, the position adjustment unit 23 adjusts the projection position in the Y-axis direction by using the average distance from the sensors 12D, 12E to the stringer 52 calculated by the position calculation unit 19.

At this time, the position adjustment unit 23 calculates a corrected distance in such a way that the calculated average distance to the skin 51 or the stringer 52 falls within a range set by predetermined thresholds. Then, the position adjustment unit 23 moves the arm 4 and the hand 5 of the machining robot 3 in the Z-axis direction or the Y-axis direction based on the calculated corrected distance, and thereby moves the position of the peening device 2. The predetermined thresholds are recorded in advance in the memory 26, for example.

The tilt adjustment unit 24 adjusts the orientation of the peening device 2 based on the tilts calculated by the tilt calculation units 20, 21, 22.

Specifically, the tilt adjustment unit 24 adjusts the orientation (posture) of the peening device 2 around the Y-axis by using the rotation angle around the Y-axis calculated by the tilt calculation unit 20. Furthermore, the tilt adjustment unit 24 adjusts the orientation (posture) of the peening device 2 around the X-axis by using the rotation angle around the X-axis calculated by the tilt calculation unit 21. Furthermore, the tilt adjustment unit 24 adjusts the orientation (posture) of the peening device 2 around the Z-axis by using the rotation angle around the Z-axis calculated by the tilt calculation unit 22.

At this time, the tilt adjustment unit 24 calculates correction angles in such a way that the calculated rotation angles around the X-axis, the Y-axis, and the Z-axis fall within ranges set by predetermined thresholds. Then, the tilt adjustment unit 24 causes the hand 5 of the machining robot 3 to be rotated around the X-axis, the Y-axis, and the Z-axis based on the calculated correction angles, and thereby changes the orientation of the peening device 2. The predetermined thresholds are recorded in advance in the memory 26, for example.

When the calculated distances and angles are determined to be within ranges set by predetermined thresholds, the projection control unit 25 projects shots at the stringer 52. Shots may thus be projected with the position and the orientation of the peening device 2 being in an optimal state for peening.

When the position and the orientation of the peening device 2 are determined to be within the predetermined ranges, the projection control unit 25 moves the blocking plate 10 to outside the passage section 15 so that shots are projected to the stringer 52. On the other hand, when the position and the orientation of the peening device 2 are determined to be outside the predetermined ranges, the projection control unit 25 moves the blocking plate 10 to the passage section 15 so that shots are not projected to the stringer 52.

After projection is started, the projection control unit 25 determines whether or not a plate thickness or a curvature of the stringer 52 reached a target value, based on a detection result of the plate thickness or the curvature of the stringer 52, and when the plate thickness or the curvature is determined to have reached the target value, projection of shots is stopped. In this case, a detection unit (not shown) that detects the plate thickness or the curvature of the stringer 52 is provided. Alternatively, after projection is started, the projection control unit 25 determines whether or not projection of a predetermined flow rate is completed, and when projection of a predetermined flow rate is determined to have been performed, projection of shots is stopped. To stop projection of shots, the projection control unit 25 moves the blocking plate 10 to the passage section 15.

As shown in FIGS. 2 and 3, the protection section 13 includes a cover portion 27 that covers an upper end portion of the stringer 52, and an elastic portion 28 which is applied with a force in a direction of pressing the cover portion 27 against the stringer 52. For example, the cover portion 27 is a member made of synthetic resin or rubber, and is a member that is long in one direction along the longitudinal direction of the stringer 52, or in other words, along the X-axis direction. A part of the workpiece is thereby covered by the cover portion 27 of the protection section 13, when a plurality of shots is projected from the nozzle 9 to the workpiece and the workpiece is deformed, and thus, deformation of the part of the workpiece covered by the cover portion 27 may be prevented. A shape of the cover portion 27 on a side that comes into contact with the stringer 52 is tilted in an umbrella shape, and thus, corners of the workpiece may be reliably protected.

For example, the elastic portion 28 is a compression spring or a cylinder mechanism. A force is applied to the elastic portion 28 in a direction of pressing the cover portion 27 against the stringer 52, when the stringer 52 is inserted into the opening section 16 and the upper end portion of the stringer 52 comes into contact with the cover portion 27.

Figure 8:
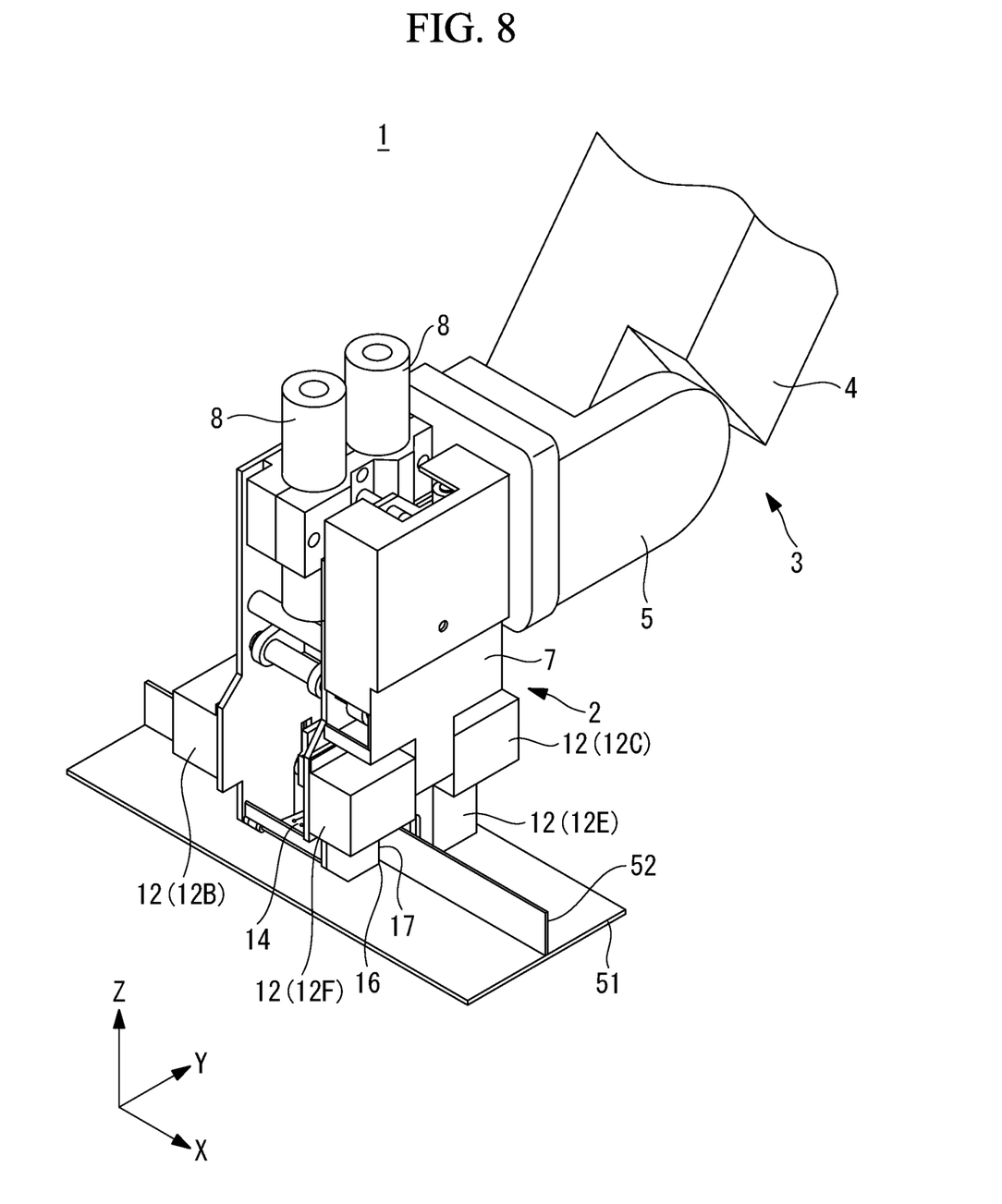
FIG. 8 is a perspective view showing a modification of the peening device according to the embodiment of the present invention.

Additionally, in the embodiment described above, a case where the sensors 12A, 12C are disposed on one side of the stringer 52 along the X-axis direction is described, but a sensor 12F may further be installed, as shown in FIG. 8. The sensor 12F is disposed on the other side of the stringer 52 along the X-axis direction, together with the sensor 12B. Accordingly, the distance to the skin 51 may be more accurately detected in a case where the plate thickness of the skin 51 is different between the one side and the other side of the stringer 52.

Figure 7:
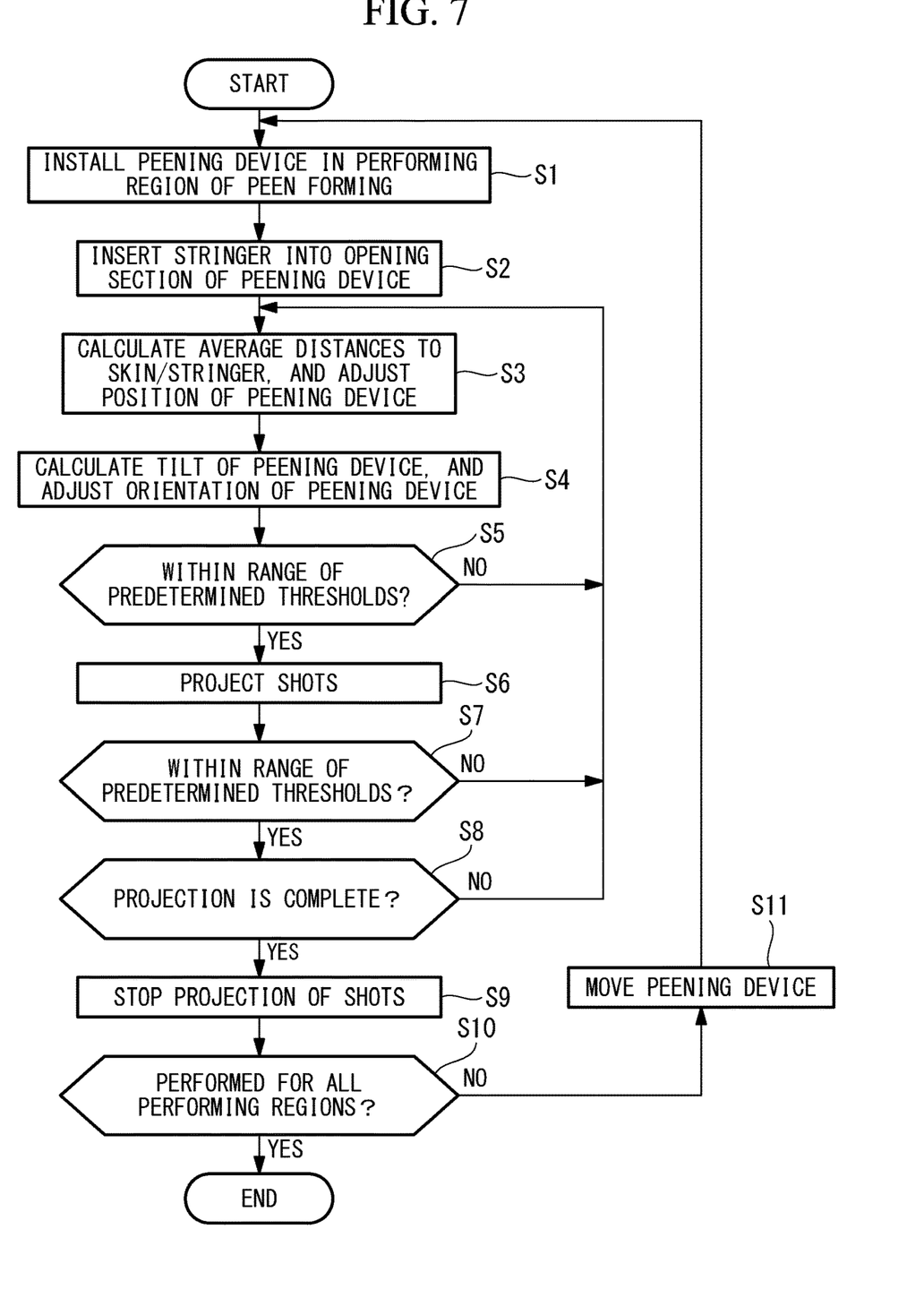
FIG. 7 is a flowchart showing a method of manufacturing an aircraft part using the aircraft part manufacturing system according to the embodiment of the present invention.

Next, a method of manufacturing an aircraft part using the aircraft part manufacturing system 1 according to the present embodiment will be described with reference to FIG. 7.

First, the peening device 2 is installed in a region, of a workpiece before machining, where peen forming is to be performed (step S1). At this time, the machining robot 3 may detect a region where machining is to be performed, based on a positioning mark or the like, and may move the peening device 2 based on the detection result. In this case, a detection unit (not shown) that detects a region where machining is to be performed is installed at the machining robot 3.

When the stringer 52 is inserted into the opening section 16 of the peening device 2 (step S2), the cover portion 27 of the protection section 13 comes into contact with the stringer 52, and the elastic portion 28 applies a force in a direction of pressing the cover portion 27 against the stringer 52.

Then, the position calculation unit 18, 19 calculates an average distance to the skin 51 or the stringer 52 based on the distances detected by the sensors 12. Furthermore, the position adjustment unit 23 adjusts the position of the peening device 2 by using the calculated average distance to the skin 51 or the stringer 52. The position adjustment unit 23 moves the position of the peening device 2 by moving the hand 5 of the machining robot 3 along the Z-axis direction or the Y-axis direction based on a calculated correction distance (step S3).

Furthermore, the tilt calculation units 20, 21, 22 calculate the tilt of the peening device 2 based on the distances detected by the sensors 12, and the tilt adjustment unit 24 adjusts the orientation of the peening device 2. The tilt adjustment unit 24 changes the orientation of the peening device 2 by rotating the hand 5 of the machining robot 3 around the X-axis, the Y-axis, and the Z-axis based on calculated correction angles (step S4).

Furthermore, whether or not the distances and the angles calculated by the position calculation units 18, 19 and the tilt calculation units 20, 21, 22 are within ranges set by predetermined thresholds is determined (step S5). When the calculated distances and angles are outside the ranges set by predetermined thresholds, adjustment of the position and the orientation of the peening device 2 in steps S3 and S4 are continued.

When the calculated distances and angles are determined to be within the ranges set by predetermined thresholds, shots are projected to the stringer 52 (step S6). Whether or not the distances and the angles calculated by the position calculation units 18, 19 and the tilt calculation units 20, 21, 22 are within the ranges set by predetermined thresholds is determined while shots are being projected (step S7). When the calculated distances and angles are outside the ranges set by predetermined thresholds, the position and the orientation of the peening device 2 are adjusted in steps S3 and S4. That is, because the stringer 52 and the skin 51, as a workpiece, are continuously deformed during projection of shots, the position and the orientation of the peening device 2 continue to be adjusted so that the position and the orientation of the peening device 2 are constantly within predetermined ranges.

After projection is started, whether or not the plate thickness or the curvature of the stringer 52 reached a target value is determined based on a detection result of the plate thickness or the curvature of the stringer 52 (step S8), and when the plate thickness or the curvature is determined to have reached the target value, projection of shots is stopped (step S9). Alternatively, after projection is started, whether or not projection of a predetermined flow rate completed is determined (step S8), and when projection of the predetermined flow rate is determined to be completed, projection of shots is stopped (step S9). At this time, the blocking plate 10 is moved to the passage section 15 to stop projection of shots to the stringer 52.

Then, whether or not peen forming is performed on all the regions where peen forming is to be performed is determined (step S10). In the case where peen forming is not performed on all the regions, the peening device 2 is moved to another region where peen forming is to be performed (step S11). After the peening device 2 is moved, peen forming is performed while detecting the position and the orientation of the peening device 2 by the method described above (step S1 and subsequent steps). On the other hand, in the case where peen forming is determined to be complete for all the regions, the series of operations is ended.

As described above, according to the present embodiment, during projection of shots by the peening device 2, the position and the orientation of the peening device 2 are detected, and the position and the orientation of the peening device 2 are adjusted. The position and the orientation of the peening device 2 are adjusted to predetermined position and orientation which are set in advance, even while the stringer 52 and the skin 51, as a workpiece, are being continuously deformed. Accordingly, shots may be constantly and accurately blasted to predetermined positions, which are set in advance, of the workpiece. As a result, accurate machining may be performed on the workpiece formed of the stringer 52 and the skin 51.

Moreover, because the upper end portion of the stringer 52 is protected from the shots by the protection section 13, deformation of the corner of the stringer 52 due to being hit by a shot may be prevented, and occurrence of cracks and reduction in strength may be prevented. Conventionally, a rubber sheet or the like is used to prevent shots from directly hitting a region which should not be deformed, such as the corner of the stringer 52, but according to the present embodiment, the time and labor required to attach a rubber sheet may be eliminated, and use of sub-materials such as the rubber sheet may be reduced. Furthermore, the cover portion 27 is applied with a pressing force toward the stringer 52 while being protected by the protection section 13 attached to the casing 7, and thus, the protection section 13 does not come off while shots are being projected at a high speed. Accordingly, an end portion of the stringer 52 is reliably protected, compared with a case of attaching a rubber sheet.

Moreover, because switching between projection and non-projection of shots may be performed by the blocking plate 10, projection of shots may be stopped while moving between two regions where peen forming is to be performed (transient period). Accordingly, shots may be projected to the stringer 52 only when the position and the orientation of the peening device 2 are securely determined, and shots are not projected when projection conditions of shots are not stable, and thus, unexpected deformation is not easily caused. Accordingly, accurate machining may be performed on a workpiece formed of the stringer 52 and the skin 51.

REFERENCE SIGNS LIST 1 aircraft part manufacturing system
2 peening devices
3 machining robots
4 arms
5 hand
6 control unit 7 casing
8 shot supply section
9 nozzles
10 blocking plate
11 reflection plate
12 sensors
12A sensor
12B sensor
12C sensor
12D sensor
12E sensor
12F sensor
13 protection section
14 sealants
15 passage section
16 opening section
17 recessed section
18 position calculation unit
19 position calculation unit
20 tilt calculation unit
21 tilt calculation unit
22 tilt calculation unit
23 position adjustment unit
24 tilt adjustment unit
25 projection control unit
26 memory
27 cover portions
28 elastic portions
50 integrated members
51 skin
52 stringers
55 aircraft part

The invention claimed is:

1. A part manufacturing system comprising:
   a peening device comprising:
      a nozzle section that comprises:
         a pair of nozzles each disposed on a respective side of a workpiece and that projects;
      a detection unit that detects a distance to the workpiece;
      a protection section that is attached to a cover of the peening device and that covers a part of the workpiece; and
      a pair of reflection plates that reflects the shots and turns flow directions of the shots projected from the nozzles toward the workpiece; and
   a robot device comprising:
      a hand section to which the peening device is attached; and
      a control unit that adjusts a position or an orientation of the peening device by controlling the hand section based on the distance detected by the detection unit, wherein
   the shots projected by the pair of nozzles and reflected by the pair of reflection plates hit the workpiece from both sides of the workpiece.

2. The part manufacturing system according to claim 1, wherein
   the workpiece is an elongated member,
   at least two detection units are provided as the detection unit, and
   the control unit adjusts the position of the peening device based on an average distance to the workpiece that is calculated from the distances detected by the at least two detection units.

3. The part manufacturing system according to claim 1, wherein
   the workpiece is an elongated member,
   at least two detection units are provided as the detection unit, and
   the control unit adjusts the orientation of the peening device based on a tilt angle of the workpiece that is calculated from the distances detected by the at least two detection units.

4. The part manufacturing system according to claim 1, wherein
   the peening device further includes a blocking section that can be installed at a passage section where the shots pass through from the nozzle section to the workpiece, and that can be installed outside the passage section, and
   when installed at the passage section, the blocking section reflects the shots projected from the nozzle section, in a direction different from a direction toward the workpiece.

* * * * *